Dec. 5, 1950 J. E. HENABERY 2,533,010
METHOD AND APPARATUS FOR VISUALLY DETERMINING
UNKNOWN VIBRATION CHARACTERISTICS
Filed June 7, 1945 2 Sheets-Sheet 1

INVENTOR.
JOSEPH E. HENABERY
BY Van Deventer + Grian
ATTORNEYS

Dec. 5, 1950     J. E. HENABERY     2,533,010
METHOD AND APPARATUS FOR VISUALLY DETERMINING
UNKNOWN VIBRATION CHARACTERISTICS
Filed June 7, 1945     2 Sheets-Sheet 2

INVENTOR.
JOSEPH E. HENABERY
BY
ATTORNEYS

Patented Dec. 5, 1950

2,533,010

UNITED STATES PATENT OFFICE 2,533,010

METHOD AND APPARATUS FOR VISUALLY DETERMINING UNKNOWN VIBRATION CHARACTERISTICS

Joseph E. Henabery, Jackson Heights, N. Y.

Application June 7, 1945, Serial No. 598,064

7 Claims. (Cl. 35—1)

This invention relates to a method of comparing visually transient outlines having unknown characteristics with a visual outline having known characteristics, and has for its object a method and apparatus where phenomena not normally of a visual nature can be visually compared.

Other objects of the invention are to provide a method and apparatus of visually determining the characteristics of vibrations in machinery, testing musical instruments and the like, in providing a method and apparatus to teach the deaf to speak, and may also be used in connection with vocal instruction.

Further objects of the invention will be apparent from the following specification and annexed drawings wherein is disclosed, by way of illustration, an apparatus with which the method can be practiced. It will be understood, however, that the method can be practiced with many other forms of apparatus and that the description herein is merely by way of illustration, the invention being defined in the appendant claims.

The method is of particular use in training an individual or a group of individuals to effectively produce particular or definite sounds of speech, and is valuable as a speech training aid for persons who are deaf or hard of hearing. It is also useful for persons who find it difficult to correctly produce vocal or speech sounds similar to those heard by them, for instance, those studying a foreign language who often find that the memory patterns fixed while learning a mother tongue make it difficult to correctly produce certain sounds and effects of a foreign language.

Normally human being learn to speak by hearing. From earliest infancy patterns of sound are impressed on the memory through the auditory sense, then by imitation of sounds, words and speech, gradually comes speech itself. It should be noted that although impressions gained through the sense of sight, touch, smell and taste contribute to general intelligence they do not ordinarily in themselves, guide a person as to how speech sounds are produced.

As many of the deaf or hard of hearing are born with this handicap or acquire it at an early age, they have little or no concept of sound, therefore they have no memory patterns of words or of speech and other kinds of sounds.

However, as a great majority of the deaf and hard of hearing have speech organs that function adequate, it is often possible to teach them how to produce sounds of speech, through making use of the senses of sight and touch, unfortunately the speech of such persons often lacks clarity and naturalness, primarily because the deaf and hard of hearing lack a satisfactory means of comparing the sounds they produce with standard or correctly produced sounds.

In the herein described method the sense of sight rather than that of hearing may be employed to give mental impressions of the effect of sound and to make comparisons between sounds produced by the student and those of a standard nature.

The method requires for this application the combined and simultaneous use of a standard visual image having known characteristics of sound, together with apparatus which can be vocally used by the student to produce a similar type of visual image.

The method for which claim is made provides a means by which the sounds produced by a student's vocal apparatus are delivered to a device capable of converting sound waves into some form of transient visual images, such as an oscilloscope, which with a microphone and other component parts, converts the waves of sound into a varying electric current that can be seen on the screen of the oscilloscope, as a visual image or images of electric wave forms.

By the use of this apparatus the student is able to see a visual image which is in effect the image of the sound produced by the student's voice.

If the student is at the same time supplied a means by which he can see the image of standard or correctly produced sounds of the same nature as those being produced by the student, he is able to compare the image of the sounds produced by his voice, with the image of the standard or correctly produced sounds, and thus the student will be induced to try to vary the production of his or her sounds to bring them in conformity with the standard or correctly produced sounds.

A method of presenting a standard or correctly produced image of sounds is to photographically record the correctly produced image of sound on a motion picture film and project the same to a motion picture viewing screen.

The viewing screen on which a standard image is projected can be placed in proximity to the image produced on the screen of the student's oscilloscope, or the projected standard image can be superimposed over the screen of the oscilloscope so that comparisons can be easily made.

In the latter case the projected standard image may be passed through a color filter, or projected through a color film, or projected with a colored light, so that the standard image will not be confused with the image produced by the student.

The method described herein can be made additionally valuable by photographically recording on the motion picture film, views of the person making the standard sounds. Such views can be in addition to the sound image on the film. For instance the lip movements of the person producing the sound may appear on the screen simultaneously and synchronously with the image of the standard sound and thus provide an additional aid for the production of sound by the student.

Both the image of the sound and the views of the person producing the standard sound or sounds may be photographed simultaneously, or this effect can be secured by separately making motion pictures of the standard sound image and of the person producing the sound or sounds, then these separate films are combined on another negative by optical or other process methods common in the motion picture industry. A print from the combined negative when projected will thus show both views, each occupying a part of the screen.

The motion picture may also be designed so that the image of the sound waves, or the image of the sound waves together with the views of the person making the sounds, may appear on the motion picture screen simultaneously with other motion picture views of articulated models, animated drawings or diagrams depicting those movements of the speech organs which are ordinarily hidden from view.

The movement or effect of such models, drawings or diagrams may be so designed and arranged that they will be in synchronism with the image of the sound appearing on the film, so that movements of the hidden organs of speech may be simulated for the purpose of making a more perfect interpretation of the effects and physical movements involved in the production of vocal sounds.

The motion picture may also have, in synchronism with a visual image, a sound track of recorded sound derived from the same sound or sounds which were used in the production of the sound wave image, however, disk records or other kinds of sound records may be reproduced in synchronism with the sound image.

By means of the sound track or by the use of other types of sound recording and with suitable reproduction apparatus, sounds or sound effects similar to the recorded sound, may be produced in a loud speaker, headphones or hearing devices, and thus persons having some hearing ability will be enabled to acquire auditory impressions of the sound or sounds being demonstrated, as well as visual impressions of the sound or sounds. Of course such auditory impressions will vary with the degree of hearing possessed by the student.

The sound reproducing equipment and the sound track on the motion picture film, or on other types of sound records, may also be used to actuate vibratory devices or sound boxes, placed before the student so that the student's sense of touch can be utilized to convey impressions of sound.

In such cases the microphone and sound amplifying devices used in connection with the student's oscilloscope, or independently, may be used by the student to actuate another sound box or vibratory device placed before the student, so that the standard sound can be compared with that made by the student.

When the student is furnished equipment similar in nature or capable of producing an effect similar to that used in producing the standard effect, he will have a means of comparing, interpreting or imitating the standard effect with the effect he produces.

If the motion picture showings are repeated often enough the student can acquire definite concepts of the correctly produced sound or sounds being demonstrated, and then by the use of a microphone, an oscilloscope and other component parts, or with vibratory devices used in connection with the microphone and other component parts, the student will be enabled to imitate the sound wave images shown in the motion picture, or those vibrations felt through means of the vibratory devices. Such imitation can be made to coincide with the standard effects.

By comparing the imitated effect, that is the sound image produced by the student with the sound image appearing on the motion picture film or on an oscilloscope or other devices capable of producing visual images; or the vibratory effects produced through use of the standard sound with those produced by the student, he will have a definite way of knowing how closely these efforts of imitation approximate the standard sound or sounds.

Naturally, the student will be induced to try to vary his method or style of voice production until the sound made by the student most closely approximates those of the standard sound image shown on the motion picture screen, or those made by the vibratory device through standard sound vibrations.

Figure 1:
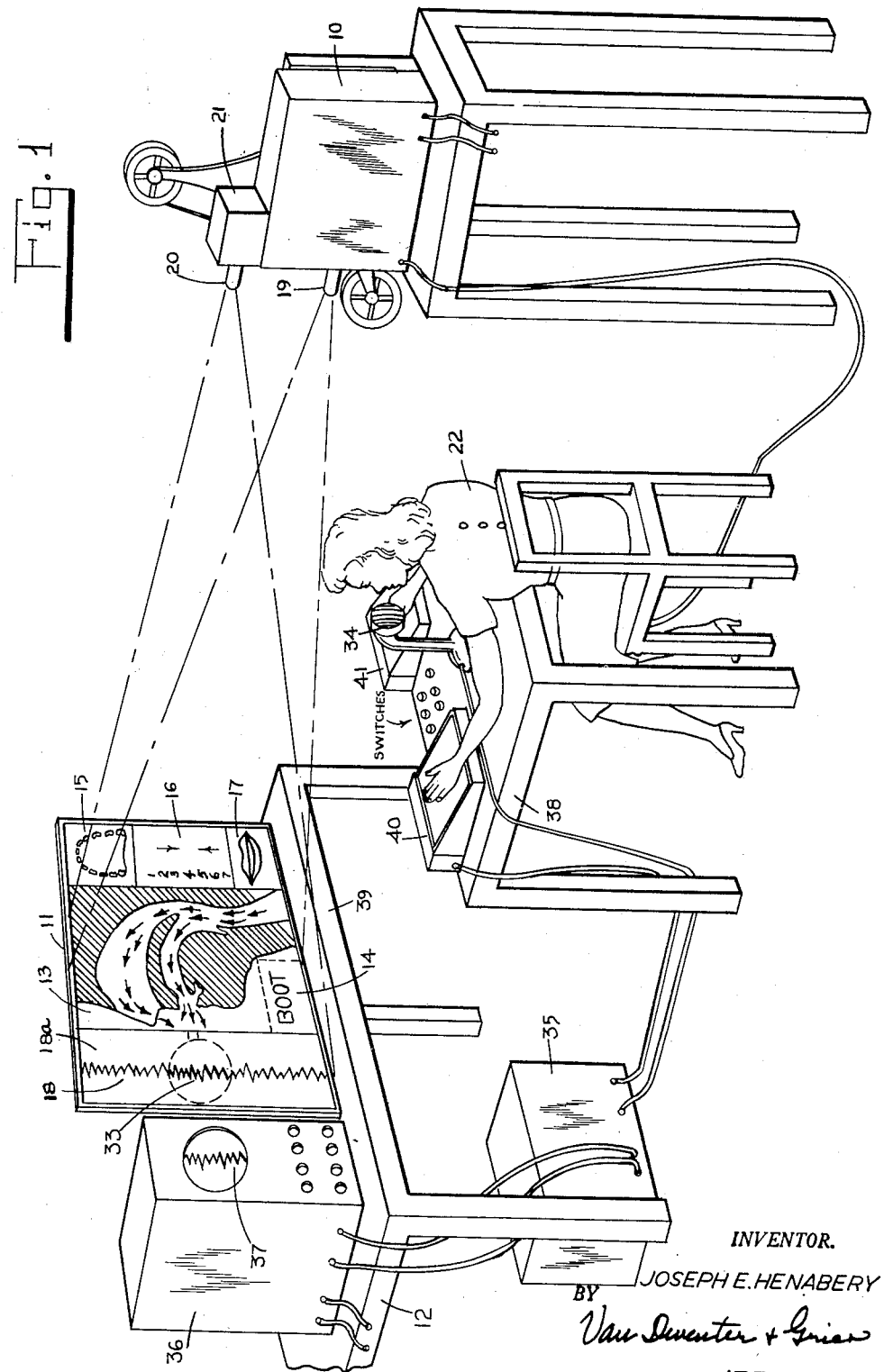
Figure 1 is a diagram illustrating an apparatus suitable for practicing the method herein disclosed.
Figure 2:
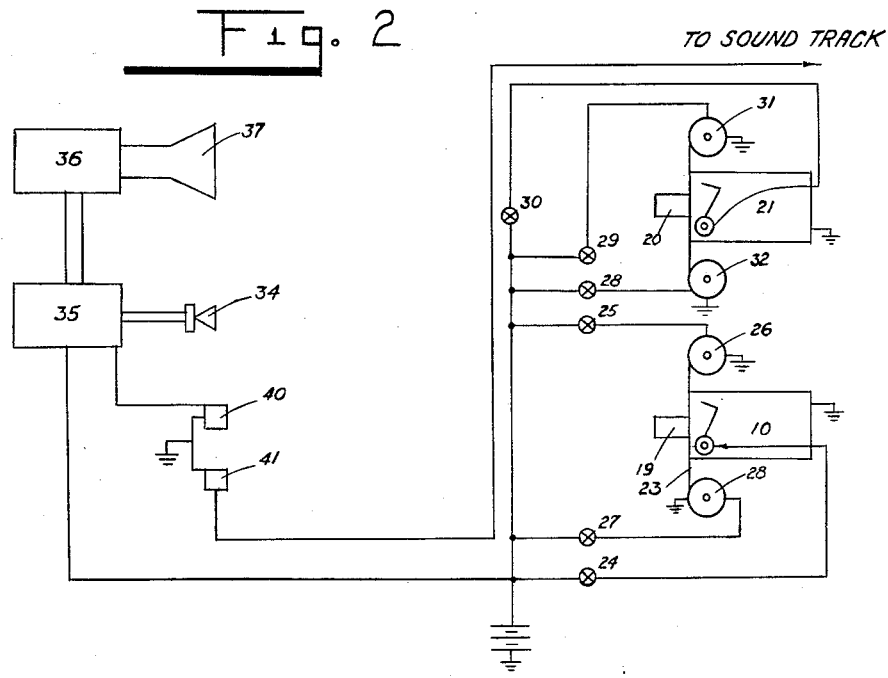
Figure 2 is a diagram of the circuit wiring of the apparatus shown in Figure 1.

A motion picture projector 10 of any suitable construction is positioned to throw a picture on to a screen generally denoted by the numeral 11. If desired the projector can be mounted on the table or other support 12 back of the screen, in order to form a unitary structure therewith.

In the projector 10 there is the usual film which may contain the following: an image, such as indicated in the space 13 of the speech action of the nasal and oral cavities and their adjacent and associated parts showing their operation during speech. At 14 there may be shown the word, letter, or other printed form of the sound being produced. In the space 15 may be shown a palatogram of the action of the palate and its associated parts. At 16 may be shown the space between the teeth, and at 17 may be shown the position of the lips. The actual image 18 of the standard recorded sound appearing in the space 18a may either be a part of the film projected by the lens 19 of the projector 10, or this section 18 may be projected via the lens 20 of a separate projector 21. This visual pattern of sound having known characteristics may be operated in synchronism with the pictures 13 to 17 inclusive or may remain stationary. The projectors 10 and 21 are arranged to be controlled by the student 22 and may be equipped with the regular step-by-step mechanism for moving the film in the ordinary way, and in addition are provided with means for running the reels forward and backward while the step mechanism is disengaged so that the student cannot only operate the projectors in synchronism with each other in the ordinary way, but can also run the films forward and backward so as to observe all parts of the standard at 18. As the construction and operation of such projectors is well known and forms no part of the present invention, it is not described here in detail.

Assuming that the films are set up in connection with the study of the pronunciation of the word "boot," and the student 22 desires to concentrate on the pronunciation of the letter "o." The film 23 and projector 19 would be started by the student operating the switch 24 which would energize the claw motion in the projector 10 to display the illustrations 13 to 17, inclusive. If the operator wished to run back a portion of the film he could push the button 25 which would operate the reel 26 to wind the film in a given direction, say backward, the claw movement being disabled the while. Or, if the operator wanted to run the film ahead he could operate the button 27 thereby operating reel 28, the claw motion in the projector 19 being disabled the while.

Having located that particular portion of the film on which the motions are visualized in connection with the pronunciation of the first "o" in "boot," the operator would then have, if the standard 18 is on the same film as the other illustrations on screen 11, a visual picture of the sound of the "o." By manipulating the buttons 24, 25 and 27 the student could again and again run over the "o" until thoroughly familiar with the outline.

If the standard 18 is on a separate film in the projector 21 then the buttons 28, 29 and 30 controlling the claw mechanism and the two reels 31, 32 in the projector 21 is operated until the correct portion of the standard appears on the screen.

Now by holding the film in projector 10 either stationary or operating it slowly, and at the same time manipulating the film in projector 21, it will be seen that the student can readily bring a given portion of the standard, such as 33, into the center of the screen for viewing purposes and will see what precedes and follows the "o."

The student having thus gotten the visual impression of the sound, now speaks into the microphone 34 which is connected to the amplifier 35 and the oscillograph 36. This causes the oscilloscope to make a visual pattern of the sound at 37. The student studying the various images on the screen 11 tries to make the visually transient pattern at 37 the same as the visual pattern having known characteristics at 18 which forms the standard. The student can thereby determine just how to hold his lips, palate and how to form the mouth space between the teeth as shown at 16, all to form the letter "o," or any other letter in the word "boot," and also how to speak the complete word.

The oscillograph instrument can be placed immediately behind screen 11 which in that case would be translucent, and in this case the end of the oscillograph tube carrying the image 37 would be immediately behind the space 33 of the standard 18, so that the known and unknown pattern would be in juxtaposition.

The amplifier 35 could also be placed upon the table 12 and this amplifier and the oscillograph enclosed in a casing (not shown) by screen 11 forming the front of the casing so that all of the apparatus including the projectors 19 and 21 may form a single unit assembly.

The desk 38 for the student can be attached to and form part of the front edge 39 of the table to still further carry out the idea of a unitary structure. On this desk is mounted the switches 24, 25, 27, 28, 29 and 30 together with the microphone 34 and a pair of vibratory devices 40 and 41. These devices may comprise box-like members having thin walled tops which act as diaphragms and which are connected to the usual loudspeaker mechanisms. These boxes may be set side by side so as to be within reach of the fingers of one hand, but preferably, they are separated as shown in the drawings, and one of these, say 41, is connected to a sound track in one of the projectors so that the box speaks the recorded sound which is of course a duplicate of the standard pattern shown at 18.

The other box 40 is connected to the circuit to the microphone 34 so that it vibrates in unison with the sounds impinging upon the microphone and therefore the vibrations of 40 correspond with the oscillograph pattern at 37.

It will now be seen that the student 22 by placing his hand, or hands upon the vibratory members 40, 41 can feel the vibrations produced by the standard sound and also by the sound which he, the student, is producing and he is therefore able to compare the visible pattern having an outline denoting known characteristics at 18 with the visible pattern at 37, said patterns being placed either side by side or one behind the other. This is a sight comparison. He can also compare the vibrations produced by both sounds simultaneously by touch. By this means the student can be given concepts and impressions of sound and speech patterns through the simultaneous use of the senses of sight and touch. As the student has control of the microphone 34 and thereby control of the characteristics of the pattern 37 he can vary this pattern until it is visually substantially identical with the standard pattern 18, and when visual identity is achieved it will be found that the sounds are identical.

It will immediately be apparent to those skilled in the art that the foregoing method and apparatus can be applied to the solution of a large number of problems involving the comparison between a visually transient outline produced by vibratory means and having unknown characteristics, and a visual outline or pattern produced by vibratory means and having known characteristics, the latter forming a standard.

Figure 3:
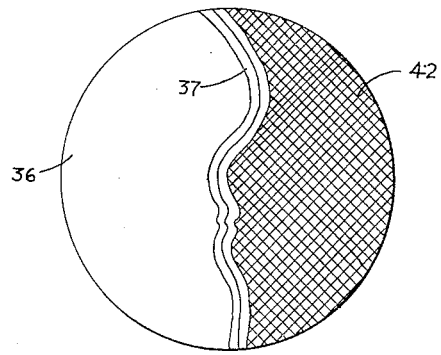
Figure 3 is a diagram showing a form of standard pattern that can be used with the apparatus shown in Figure 1.

For example, the apparatus just described omitting the projectors 19 and 21 may be used to advantage in determining the characteristics of musical instruments. A sound curve is made of a note of known characteristics. Photographs of such sound curves will be found in the article entitled, "Certain Applications of Physical Principles to the Playing of Musical Instruments," in the Journal of the Franklin Institute for March 1945. Suitable portions of such curves may be used to produce a standard templet or pattern such as indicated at 42 in Figure 3. This pattern can be laid against the end of the oscillograph tube so as to be adjacent the path of the pattern 37. The musical instrument under test is played in front of the microphone 34 and the necessary adjustments in the instrument made until the pattern 37 coincides with the standard 42. This method of comparison enables certain adjustments to be made which may be independent of the volume of the sound produced and enables such adjustments to be made by persons who may not have an accurate sense of pitch and tonal quality and are valuable in connection with making resonance measurements such as those described in the paper entitled, "The Violin" by Paul Jarnak, Journal of the Franklin Institute, March 1938 issue. In connection with graphic methods of comparing sounds as discussed in the tenth edition of "Ganot's Physics," this apparatus is particularly valuable, the standard pattern being produced by a tuning fork tracing and the unknown pattern being produced by any vibratory means that will translate mechanical vibrations into electrical impulses suitable for operating an oscillograph and the like. The permissible vibrations in machiney can be readily determined by making up a standard pattern such as 42 in which the maximum permissible vibration is visually indicated. Machines under test are then compared by causing them in turn to produce the unknown pattern such as 37. By comparing these patterns the relative amplitude can be readily determined and furthermore any variation in frequency and pitch is instantly detected. Often in connection with mechanical apparatus it is not the amplitude of the vibration which is as important as the pitch or rate and in some cases a steady rate of vibration is not objectionable, but unsteady vibrations are.

In connection with apparatus for observing Lissajoux, figures as referred to in "Ganot's Physics" hereinbefore mentioned, this method is valuable as it enables any form of vibratory motion to be visually compared with any other form.

What is claimed is:

1. In a device of the character described, a projector adapted to project an image from a film having an outline produced by sound and having known characteristics, means operable by sound for producing a visible image having an outline denoting the characteristics of the sound acting upon said means, and means for placing said images in juxtaposition whereby they may be simultaneously visually compared.

2. The device as claimed in claim 1 including means for manually comparing the vibrations corresponding to each of said images, whereby simultaneous comparisons of the vibrating characteristics of said images can be made by sight and touch.

3. In an apparatus of the class described, a translucent screen, means in front of said screen for optically projecting from a film a visual pattern thereon produced by sounds, an oscilloscope in the rear of said screen, and means operable by sound for generating rays in said oscilloscope to produce a visual wave pattern on the face of the tube thereof adjacent the rear of said screen whereby said wave pattern may be simultaneously compared with that portion of the visual pattern projected on the front of the screen overlying said wave pattern.

4. The device as claimed in claim 3 including means for manually comparing vibrations corresponding to each of said patterns, whereby simultaneous comparisons of the characteristics of said patterns can be made by sight and touch.

5. The method of comparing a visually transient outline produced by sound having unknown characteristics with a visual outline produced by sound having known characteristics, which includes the step of projecting to a screen for visual observation from a permanent visual record the image of a recorded sound having known characteristics, the step of producing by electronic means an image produced by a second sound, and the step of varying the characteristics of said second sound until the image of same visually matches said first image, said first image containing images of sounds preceding and succeeding a portion of said image to which said second sound is visually matched, the speed of projection of said images of said first sound being variable without altering the outline characteristics thereof.

6. The method as claimed in claim 5 including the further step of simultaneously manually comparing mechanical vibrations corresponding to said sounds while visually observing same.

7. Apparatus for teaching the deaf to speak, including means for producing a visual image of a sound to be imitated by the user of the apparatus, including a projector and a film thereon and a screen to receive said image, a second means under the control of the user of the apparatus for producing a second visual image of sound to imitate said first sound, means for simultaneously viewing said images and means within control of the user for repeating said first image as desired for comparison purposes with said second visual image.

JOSEPH E. HENABERY.

REFERENCES CITED

The following references are of record in the file of this patent:

UNITED STATES PATENTS

| Number | Name | Date |
|---|---|---|
| 660,255 | Kingma | Oct. 23, 1900 |
| 1,749,090 | Shelby | Mar. 4, 1930 |
| 1,850,899 | Smith | Mar. 22, 1932 |
| 2,087,485 | Severy | July 20, 1937 |
| 2,130,134 | Iams | Sept. 13, 1938 |
| 2,152,955 | Coyne | Apr. 4, 1939 |
| 2,209,157 | Glunt | July 23, 1940 |
| 2,212,431 | Bly | Aug. 20, 1940 |
| 2,217,831 | Ballard | Oct. 15, 1940 |
| 2,301,826 | Steudel | Nov. 10, 1942 |
| 2,306,391 | Keinath | Dec. 29, 1942 |
| 2,344,296 | Frink | Mar. 14, 1944 |
| 2,416,353 | Shipman | Feb. 25, 1947 |

FOREIGN PATENTS

| Number | Country | Date |
|---|---|---|
| 7,522 | Great Britain | 1913 |

OTHER REFERENCES

Chicago Apparatus Company Catalog, 1931, page 356.